(12) United States Patent
Hinkle et al.

(10) Patent No.: US 9,104,557 B2
(45) Date of Patent: Aug. 11, 2015

(54) ENCODED CHIP SELECT FOR SUPPORTING MORE MEMORY RANKS

(75) Inventors: Jonathan Randall Hinkle, Raleigh, NC (US); Justin Potok Bandholz, Cary, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 2010 days.

(21) Appl. No.: 12/184,430

(22) Filed: Aug. 1, 2008

(65) Prior Publication Data
US 2010/0030942 A1 Feb. 4, 2010

(51) Int. Cl.
*G06F 12/06* (2006.01)
(52) U.S. Cl.
CPC ............ *G06F 12/06* (2013.01); *G06F 12/0607* (2013.01)
(58) Field of Classification Search
USPC ............................................................ 711/5
See application file for complete search history.

(56) References Cited

U.S. PATENT DOCUMENTS

| | | | | |
|---|---|---|---|---|
| 5,630,167 | A * | 5/1997 | Hosokawa | 710/3 |
| 6,880,094 | B2 * | 4/2005 | LaBerge | 713/300 |
| 7,046,538 | B2 | 5/2006 | Kinsley et al. | |
| 2003/0076734 | A1 * | 4/2003 | Ryan et al. | 365/233 |
| 2005/0021922 | A1 * | 1/2005 | Munguia et al. | 711/170 |
| 2006/0039205 | A1 | 2/2006 | Cornelius | |
| 2006/0044860 | A1 | 3/2006 | Kinsley et al. | |
| 2006/0117152 | A1 * | 6/2006 | Amidi et al. | 711/154 |
| 2006/0129755 | A1 * | 6/2006 | Raghuram | 711/105 |
| 2006/0198178 | A1 | 9/2006 | Kinsley et al. | |
| 2007/0079049 | A1 | 4/2007 | LaBerge | |
| 2008/0068900 | A1 | 3/2008 | Bhakta et al. | |
| 2008/0098277 | A1 | 4/2008 | Hazelzet | |

OTHER PUBLICATIONS

Memory Ranks and Intel E7320/E7520 Chipset-based Servers, Kingston 2005.*
Cupal, Jerry J., Member IEEE "A Technique for the Design of Microprocessor Memory Systems", IEEE Tarnsactions on Education, vol. 37, No. 3, Aug. 1994.

* cited by examiner

*Primary Examiner* — Duc Doan
(74) *Attorney, Agent, or Firm* — Katherine S. Brown; Jeffrey L. Streets

(57) ABSTRACT

Method and systems are disclosed for increasing the number of ranks supported in a memory system. In one embodiment, a plurality of predefined subsets of memory chips on a memory module is selected. A chip select signal uniquely identifying the selected subset of memory chips is generated. The chip select signal is encoded as a multi-bit word having a bit width that is less than the number of predefined subsets of memory chips. Each bit of the encoded chip select signal is transmitted along a separate chip select line. The transmitted chip select signal is decoded to determine the identity of the selected subset of memory chips. The selected subset of memory chips identified by the decoded chip select signal are read or written.

18 Claims, 7 Drawing Sheets

Single DIMM Per Channel, 4-Rank DIMM Inserted
8-BIT CS_IN    4-Bit CS_OUT

| Rank # | CS bit 1 | CS bit 2 | CS bit 3 | CS bit 4 | CS bit 5 | CS bit 6 | CS bit 7 | CS bit 8 | CS bit 1 | CS bit 2 | CS bit 3 | CS bit 4 |
|---|---|---|---|---|---|---|---|---|---|---|---|---|
| None   | 1 | 1 | 1 | 1 | 1 | 1 | 1 | 1 | 1 | 1 | 1 | 1 |
| Rank-1 | 0 | 1 | 1 | 1 | 1 | 1 | 1 | 1 | 0 | 1 | 1 | 1 |
| Rank-2 | 1 | 0 | 1 | 1 | 1 | 1 | 1 | 1 | 1 | 0 | 1 | 1 |
| Rank-3 | 1 | 1 | 0 | 1 | 1 | 1 | 1 | 1 | 1 | 1 | 0 | 1 |
| Rank-4 | 1 | 1 | 1 | 0 | 1 | 1 | 1 | 1 | 1 | 1 | 1 | 0 |

FIG. 2

Single DIMM Per Channel, 8-Rank DIMM Inserted
8-BIT CS_IN    4-Bit CS_OUT

| Rank # | CS bit 1 | CS bit 2 | CS bit 3 | CS bit 4 | CS bit 5 | CS bit 6 | CS bit 7 | CS bit 8 | CS bit 1 | CS bit 2 | CS bit 3 | CS bit 4 |
|---|---|---|---|---|---|---|---|---|---|---|---|---|
| None   | 1 | 1 | 1 | 1 | 1 | 1 | 1 | 1 | 1 | 1 | 1 | 1 |
| Rank-1 | 0 | 1 | 1 | 1 | 1 | 1 | 1 | 1 | 0 | 1 | 1 | 1 |
| Rank-2 | 1 | 0 | 1 | 1 | 1 | 1 | 1 | 1 | 1 | 0 | 1 | 1 |
| Rank-3 | 1 | 1 | 0 | 1 | 1 | 1 | 1 | 1 | 1 | 1 | 0 | 1 |
| Rank-4 | 1 | 1 | 1 | 0 | 1 | 1 | 1 | 1 | 1 | 1 | 1 | 0 |
| Rank-5 | 1 | 1 | 1 | 1 | 0 | 1 | 1 | 1 | 0 | 1 | 1 | 1 |
| Rank-6 | 1 | 1 | 1 | 1 | 1 | 0 | 1 | 1 | 1 | 0 | 1 | 1 |
| Rank-7 | 1 | 1 | 1 | 1 | 1 | 1 | 0 | 1 | 1 | 1 | 0 | 1 |
| Rank-8 | 1 | 1 | 1 | 1 | 1 | 1 | 1 | 0 | 1 | 1 | 1 | 0 |

FIG. 4

Two DIMMs Per Channel, Two 4-Rank DIMMs Inserted

| Memory Controller | 8-BIT CS_IN | | | | | | | | DIMM | 8-Bit CS_OUT | | | | | | | | | | | | | | | |
|---|---|---|---|---|---|---|---|---|---|---|---|---|---|---|---|---|---|---|---|---|---|---|---|---|---|
| | | | | | | | | | | DIMM socket 1 | | | | | | | | DIMM socket 2 | | | | | | | |
| Rank # | CS bit 1 | CS bit 2 | CS bit 3 | CS bit 4 | CS bit 5 | CS bit 6 | CS bit 7 | CS bit 8 | Rank # | CS bit 1 | CS bit 2 | CS bit 3 | CS bit 4 | CS bit 5 | CS bit 6 | CS bit 7 | CS bit 8 | CS bit 1 | CS bit 2 | CS bit 3 | CS bit 4 | CS bit 5 | CS bit 6 | CS bit 7 | CS bit 8 |
| None | 1 | 1 | 1 | 1 | 1 | 1 | 1 | 1 | None | 1 | 1 | 1 | 1 | 1 | 1 | 1 | 1 | 1 | 1 | 1 | 1 | 1 | 1 | 1 | 1 |
| Rank-1 | 0 | 1 | 1 | 1 | 1 | 1 | 1 | 1 | Rank-1 | 0 | 1 | 1 | 1 | 1 | 1 | 1 | 1 | 1 | 1 | 1 | 1 | 1 | 1 | 1 | 1 |
| Rank-2 | 1 | 0 | 1 | 1 | 1 | 1 | 1 | 1 | Rank-2 | 1 | 0 | 1 | 1 | 1 | 1 | 1 | 1 | 1 | 1 | 1 | 1 | 1 | 1 | 1 | 1 |
| Rank-3 | 1 | 1 | 0 | 1 | 1 | 1 | 1 | 1 | Rank-3 | 1 | 1 | 0 | 1 | 1 | 1 | 1 | 1 | 1 | 1 | 1 | 1 | 1 | 1 | 1 | 1 |
| Rank-4 | 1 | 1 | 1 | 0 | 1 | 1 | 1 | 1 | Rank-4 | 1 | 1 | 1 | 0 | 1 | 1 | 1 | 1 | 1 | 1 | 1 | 1 | 1 | 1 | 1 | 1 |
| Rank-5 | 1 | 1 | 1 | 1 | 0 | 1 | 1 | 1 | Rank-1 | 1 | 1 | 1 | 1 | 1 | 1 | 1 | 1 | 0 | 1 | 1 | 1 | 1 | 1 | 1 | 1 |
| Rank-6 | 1 | 1 | 1 | 1 | 1 | 0 | 1 | 1 | Rank-2 | 1 | 1 | 1 | 1 | 1 | 1 | 1 | 1 | 1 | 0 | 1 | 1 | 1 | 1 | 1 | 1 |
| Rank-7 | 1 | 1 | 1 | 1 | 1 | 1 | 0 | 1 | Rank-3 | 1 | 1 | 1 | 1 | 1 | 1 | 1 | 1 | 1 | 1 | 0 | 1 | 1 | 1 | 1 | 1 |
| Rank-8 | 1 | 1 | 1 | 1 | 1 | 1 | 1 | 0 | Rank-4 | 1 | 1 | 1 | 1 | 1 | 1 | 1 | 1 | 1 | 1 | 1 | 0 | 1 | 1 | 1 | 1 |

FIG. 6

Two DIMMs Per Channel, 8-rank DIMM inserted in socket 1

| Memory Controller | 8-BIT CS_IN | | | | | | | | DIMM | 8-Bit CS_OUT | | | | | | | | | | | | | | | |
|---|---|---|---|---|---|---|---|---|---|---|---|---|---|---|---|---|---|---|---|---|---|---|---|---|---|
| | | | | | | | | | | DIMM socket 1 | | | | | | | | DIMM socket 2 | | | | | | | |
| Rank # | CS bit 1 | CS bit 2 | CS bit 3 | CS bit 4 | CS bit 5 | CS bit 6 | CS bit 7 | CS bit 8 | Rank # | CS bit 1 | CS bit 2 | CS bit 3 | CS bit 4 | CS bit 5 | CS bit 6 | CS bit 7 | CS bit 8 | CS bit 1 | CS bit 2 | CS bit 3 | CS bit 4 | CS bit 5 | CS bit 6 | CS bit 7 | CS bit 8 |
| None | 1 | 1 | 1 | 1 | 1 | 1 | 1 | 1 | None | 1 | 1 | 1 | 1 | 1 | 1 | 1 | 1 | 1 | 1 | 1 | 1 | 1 | 1 | 1 | 1 |
| Rank-1 | 0 | 1 | 1 | 1 | 1 | 1 | 1 | 1 | Rank-1 | 0 | 1 | 1 | 1 | 1 | 1 | 1 | 1 | 1 | 1 | 1 | 1 | 1 | 1 | 1 | 1 |
| Rank-2 | 1 | 0 | 1 | 1 | 1 | 1 | 1 | 1 | Rank-2 | 1 | 0 | 1 | 1 | 1 | 1 | 1 | 1 | 1 | 1 | 1 | 1 | 1 | 1 | 1 | 1 |
| Rank-3 | 1 | 1 | 0 | 1 | 1 | 1 | 1 | 1 | Rank-3 | 1 | 1 | 0 | 1 | 1 | 1 | 1 | 1 | 1 | 1 | 1 | 1 | 1 | 1 | 1 | 1 |
| Rank-4 | 1 | 1 | 1 | 0 | 1 | 1 | 1 | 1 | Rank-4 | 1 | 1 | 1 | 0 | 1 | 1 | 1 | 1 | 1 | 1 | 1 | 1 | 1 | 1 | 1 | 1 |
| Rank-5 | 1 | 1 | 1 | 1 | 0 | 1 | 1 | 1 | Rank-5 | 1 | 1 | 1 | 1 | 0 | 1 | 1 | 1 | 1 | 1 | 1 | 1 | 1 | 1 | 1 | 1 |
| Rank-6 | 1 | 1 | 1 | 1 | 1 | 0 | 1 | 1 | Rank-6 | 1 | 1 | 1 | 1 | 1 | 0 | 1 | 1 | 1 | 1 | 1 | 1 | 1 | 1 | 1 | 1 |
| Rank-7 | 1 | 1 | 1 | 1 | 1 | 1 | 0 | 1 | Rank-7 | 1 | 1 | 1 | 1 | 1 | 1 | 0 | 1 | 1 | 1 | 1 | 1 | 1 | 1 | 1 | 1 |
| Rank-8 | 1 | 1 | 1 | 1 | 1 | 1 | 1 | 0 | Rank-8 | 1 | 1 | 1 | 1 | 1 | 1 | 1 | 0 | 1 | 1 | 1 | 1 | 1 | 1 | 1 | 1 |

FIG. 8

ENCODED CHIP SELECT FOR SUPPORTING MORE MEMORY RANKS

BACKGROUND OF THE INVENTION

1. Field of the Invention

The present invention relates to main memory systems for computer systems, and more specifically to supporting multiple memory ranks per channel.

2. Background of the Related Art

Memory modules, such as dual in-line memory modules (DIMMs), include one or more ranks of memory. A rank is a subset of memory chips that can be accessed on a DIMM. The number of ranks on a DIMM, or the number of ranks collectively provided on a memory channel having one or more DIMMs, is the number of independent sets of DRAMs that can be accessed for the full data bit-width of the DIMM, which is typically 64 bits plus eight optional ECC (error correcting code) bits. The main memory bus typically includes a number of read/write data lines (e.g. an I/O data path) corresponding to the data bit-width of each rank of DIMMs on the memory channel. Two ranks cannot be accessed simultaneously because each rank shares the same data path provided by the memory bus. Therefore, the main memory bus also includes chip select (CS) lines to select which rank of memory receive and respond to commands at any given moment.

In a conventional memory system, each CS line is uniquely associated with a different rank on a memory channel. A rank is accessed by activating the CS line with which it is associated. For example, a memory channel having two quad-rank DIMMs, totaling eight ranks on the memory channel, may be allocated eight CS lines on the memory bus, with each CS line designating one of the eight ranks. CS lines are usually "active low," meaning that a CS line is active at the lower of two voltages, corresponding to a binary "0." Assuming the currently active CS line is active low, the remaining CS lines are each driven "high," as a binary "1" to inactivate the other ranks on the shared bus.

To support the development of quad-rank DIMM, which currently remains in common use, the standard pinout for both DDR2 and DDR3 DIMMs include pins for four CS lines to be routed through the socket to the DIMM. A memory controller having eight CS pins can be used to control two quad-rank DIMMs per channel, with four of the CS pins designating four ranks of one DIMM and the other four CS pins designating four ranks of the other DIMM.

BRIEF SUMMARY OF THE INVENTION

A first embodiment of the present invention provides a method, wherein one of a plurality of predefined subsets of memory chips (e.g. ranks) on a memory module are selected. A chip select signal is generated uniquely identifying the selected subset of memory chips. The chip select signal may be a multi-bit word having a bit width equal to the number of predefined subsets of memory chips, and having only a single active bit corresponding to the selected subset of memory chips. The chip select signal is then encoded as a multi-bit word having a bit width that is less than the number of predefined subsets of memory chips. Each bit of the encoded chip select signal is transmitted along a separate chip select line. The transmitted chip select signal is received and decoded, and the selected subset of memory chips identified by the decoded chip select signal is read or written.

A second embodiment of the invention provides a memory system. A memory controller is in communication with a plurality of chip select lines on a memory bus. Each chip select line is uniquely associated with a different memory rank. The memory controller is configured for selecting one of the memory ranks and activating the chip select line uniquely associated with the selected rank. A signal encoder is in communication with the chip select lines and is configured for selectively encoding a multi-bit word representing the selected rank using fewer bits than the number of ranks. A memory module socket is in communication with the signal encoder and the memory controller over the memory bus. A memory module is removably inserted in the memory module socket. The memory module includes at least some of the plurality of memory ranks and a register for receiving and interpreting the multi-bit word from the signal encoder to determine the selected rank and for routing read/write signals between the memory controller and the selected rank over the memory bus if the selected rank is on the memory module.

A third embodiment provides a memory bus that includes a first plurality of chip select lines for communication with chip select output pins of a memory controller. A signal encoder has inputs for each of the first plurality of chip select lines. A logic circuit encodes input signals received over the inputs to form output signals over a second plurality of outputs in communication with a memory module socket, wherein the second plurality of outputs is less than the first plurality of chip select lines.

BRIEF DESCRIPTION OF THE SEVERAL VIEWS OF THE DRAWINGS

FIG. 2 is a table illustrating the eight-bit input to the legacy encoder of FIG. 1 and the four-bit output of the legacy encoder.

FIG. 4 is a table correlating the eight CS inputs and the four-bit output.

FIG. 6 is a table illustrating the eight-bit input to the legacy encoder of FIG. 5, and the corresponding eight-bit output.

FIG. 8 is a table correlating the eight CS inputs to the memory system of FIG. 7 and the corresponding four-bit CS output.

DETAILED DESCRIPTION OF THE INVENTION

The invention includes embodiments of memory systems and methods that allow existing ("legacy") memory system components to support the use of a DIMM having greater than four memory ranks using encoded chip select signals. For example, a memory system may be constructed that allows an eight-rank DIMM to be used in an industry-standard DIMM socket having only four chip select pins. Such a memory system may also be compatible with an existing four-rank DIMM. In one embodiment, a legacy encoder is placed in communication with a memory controller and one or more DIMMs on a given memory channel. The legacy encoder inputs each of the memory channel's CS lines and, with low-latency, allows for the output of all of those signals to be either passed straight through to the DIMMs or communicated to the DIMMs in an encoded state. In contrast to prior art memory systems, which are limited to selecting a rank using a single active bit, the chip select signals for at least some of the ranks may be encoded using more than one active bit to increase the number of ranks that may be uniquely specified for a given number of chip select lines. For example, each of the memory ranks of an eight-rank DIMM may be uniquely specified using a different four-bit word. Some of the four-bit words may include a single active bit, but at least some of the four-bit words will include more than one active bit, which increases the number of ranks that may be uniquely specified using only four CS lines. Thus, the use of the legacy encoder may allow a DIMM to support double (or more) the number of ranks as previously allowed by the standard pinout of memory controllers, DIMM sockets, and other "one-hot" chip select subsystems. Specifically, it may be possible to select up to $2^N$ ranks on a DIMM, where N is the number of chip select lines or "bits" in the new signal sent to the DIMM.

Figure 1:
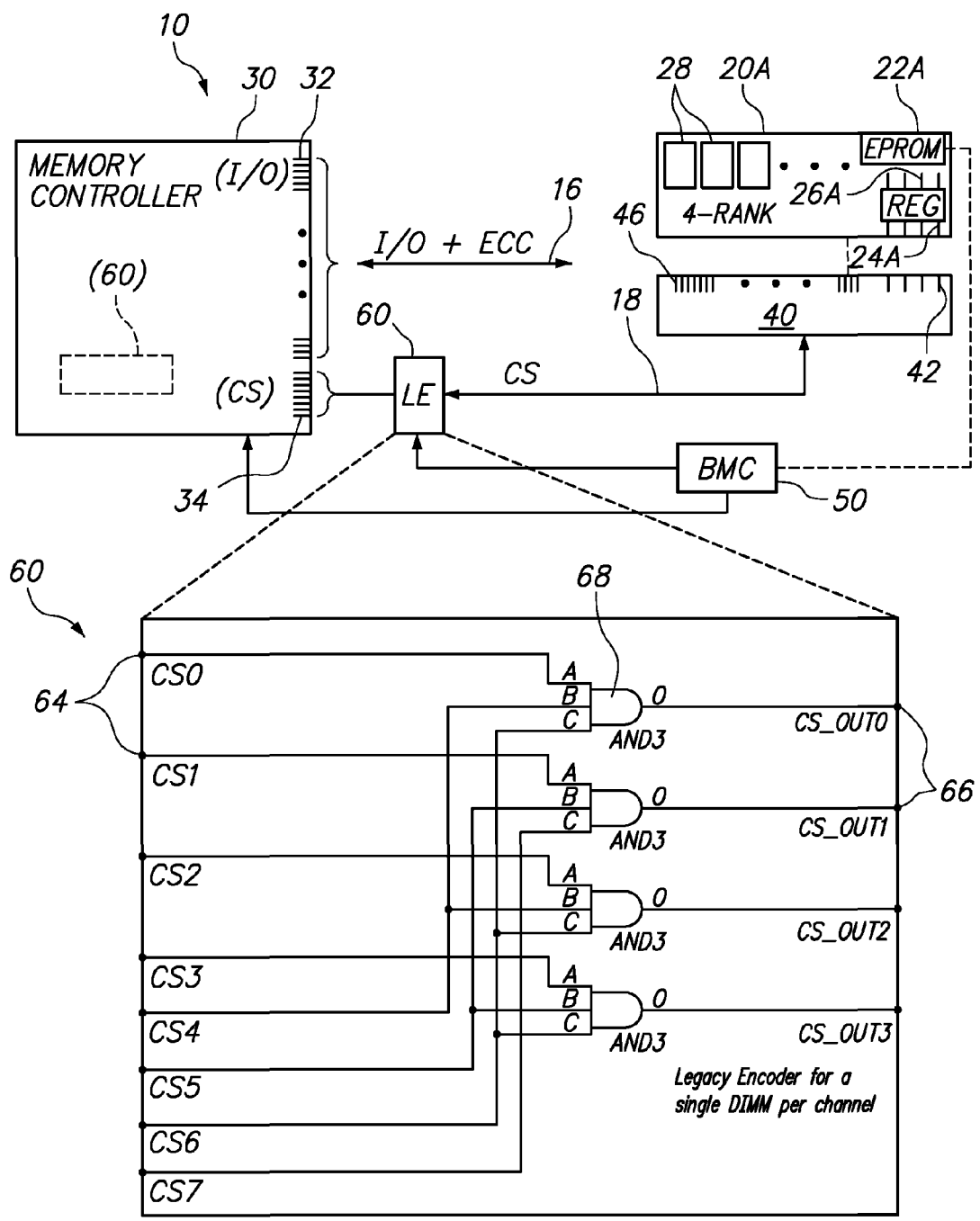
FIG. 1 is a schematic diagram of a one DIMM per channel memory system according to an embodiment of the invention, configured for interchangeably receiving a four-rank or eight-rank DIMM

FIG. 1 is a schematic diagram of a one DIMM per channel memory system 10 according to an embodiment of the invention, configured for interchangeably receiving a four-rank or eight-rank DIMM. A conventional quad-rank (i.e. four-rank) DIMM 20A is installed in a DIMM socket 40 in FIG. 1. The four-rank DIMM 20A has a plurality of memory packages 28, each having one or more DRAM memory chips. One skilled in the art will appreciate that the number of ranks on the DIMM 20A is related to the manner in which the DRAM chips in the memory packages 28 are logically connected, and not necessarily to the physical arrangement or quantity of the DRAM chips on the DIMM 20A. A memory controller 30 has seventy-two data pins 32, including sixty-four data I/O pins for transmitting 64-bit wide read/write (input/output or "I/O") bus transactions plus 8 optional error correction code ("ECC") data read/write I/O pins. The memory controller 30 also has eight CS pins 34, for individually transmitting chip-select (control) signals. AA seventy-two-bit data bus 16 is provided between the memory controller 30 and the DIMM socket 40, including a sixty-four-bit and optional eight error correction (ECC) data path. An eight-bit CS control bus 18 (i.e., having eight "CS lines") carries the CS signals transmitted by the memory controller 30 to select which DRAM(s) 28 will be sending and receiving on the data bus 16. The DIMM socket 40 has only four CS pins 42, which is typical of the standard pinout for four-rank DIMM sockets.

The memory controller 30, DIMM socket 40, data bus 16, and CS control bus 18 may be conventional components used elsewhere in conventional memory systems, and may therefore be referred to as "legacy" components. A signal encoder, alternately referred to as a legacy encoder ("LE") 60, allows the memory system 10 to use either the four-rank DIMM 20A or an eight-rank DIMM 20B (FIG. 3), despite the limitation of only four CS pins 42 on the DIMM socket 40. The legacy encoder 60 may be embodied in the form of a separate integrated circuit chip disposed on a circuit board with the memory controller 30, as illustrated. Using a separate chip would facilitate implementing the legacy encoder 60 in existing memory system designs, using an existing memory controller. Alternatively, the legacy encoder may be an additional circuit forming part of the memory controller 30, as indicated in a dashed line type.

When any DIMM is inserted into the DIMM socket 40, a service processor or other serial bus controller device 50, which in this embodiment is a baseboard management controller (BMC) 50, reads an EPROM on the inserted DIMM to determine specifications of the inserted DIMM, including the number of ranks. An EPROM, or Erasable Programmable Read-Only Memory, is a type of computer non-volatile memory chip that retains its data when its power supply is switched off. The BMC 50 may report the number of ranks to the memory controller 30 so that the memory controller 30 can utilize a number of CS pins 34 equal to the number of ranks to be controlled. The memory controller 30 uniquely associates each rank to be controlled with a separate CS pin on the memory controller 30. The BMC 50 can also report the number of ranks to the legacy encoder 60.

In particular, with the conventional four-rank DIMM 20A inserted into the DIMM socket 40 in FIG. 1, the BMC 50 reads the EPROM 22A and reports the presence of the four-rank DIMM 20A to the legacy encoder 60. Only four of the eight CS pins 34 are used by the memory controller 30 to select from among the respective four ranks on the DIMM 20A. The memory controller 30 will associate each of the four utilized CS pins 34 with a respective rank in the four-rank DIMM. The memory controller 30 may thus select a particular rank by activating the associated CS pin 34, e.g. by outputting a 0 at the CS pin associated with the selected rank and outputting 1s for the remaining three CS pins 34. In this particular embodiment, the other four CS pins on the memory controller are not utilized because the system does not include a second DIMM socket. With the four-rank DIMM 20A inserted, each rank may be uniquely specified using a single active bit. Therefore, in response to receiving a single-active bit from the memory controller 30 specifying a selected rank, the legacy encoder 60 may output a four bit word to the CS control bus 18. The single active bit from one of the CS pins 34 on the memory controller 30 may be essentially re-driven through the legacy encoder 60, such that the position of the single-active in the four-bit word has the same relative position as the single active bit on the CS pin 34.

An expanded view of the circuitry of the legacy encoder 60 is schematically shown in FIG. 1. The legacy encoder 60 includes eight CS inputs 64 labeled from "CS0" to "CS7" and four CS outputs 66 labeled from "CS_Out0" to "CS_Out3." The CS inputs 64 are coupled to the eight CS pins 34 on the memory controller 30. Thus, the CS pins 34 are capable of providing up to an eight-bit input to the legacy encoder 60. The CS outputs 66 are coupled to four of the CS lines (i.e. a four-bit data path) on the eight-bit CS control bus 18. The CS inputs 64 are tied to the CS outputs 66 through an exemplary configuration of "AND" gates 68. With only the single four-rank DIMM 20A to be controlled, the legacy encoder 60 may simply pass through the chip select signals generated as bits at the CS pins 34 on the memory controller 30, from the CS inputs CS0-CS3 to the CS outputs CS_Out0-CS_Out3, to provide a single-active, four-bit output that is the same as if the legacy encoder was not installed in the memory bus.

FIG. 2 is a table illustrating an exemplary eight-bit input to the legacy encoder and the corresponding four-bit output of the legacy encoder in a single DIMM per channel memory system with a four-rank DIMM inserted, such as in FIG. 1. A "Rank" column lists the eight ranks that the memory controller is capable of selecting from. Eight "CS_IN" columns list the bit state (0 or 1) of the eight CS pins on the memory controller, which represents the eight-bit input to the legacy encoder. Each rank may be uniquely identified by the memory controller with an eight-bit word consisting of one active bit (0) corresponding to the currently selected rank and seven inactive bits (1s). For example, the memory controller may select Rank-2 by generating the eight-bit word "1 0 1 1 1 1 1 1," in which case the four-bit output is "1 0 1 1." Though the memory controller is capable of recognizing up to eight ranks, available ranks 5-8 are not used when the four-rank DIMM is installed, and are omitted from the table. The CS_OUT bits from the memory controller for ranks 5-8 may be driven high as "1s" or simply turned off. The inserted four-rank DIMM may simply receive and use the received bit encoding for Ranks 1-4 in a conventional manner to allow only one rank at a time to read the data sent from the memory controller over the data bus.

Figure 3:
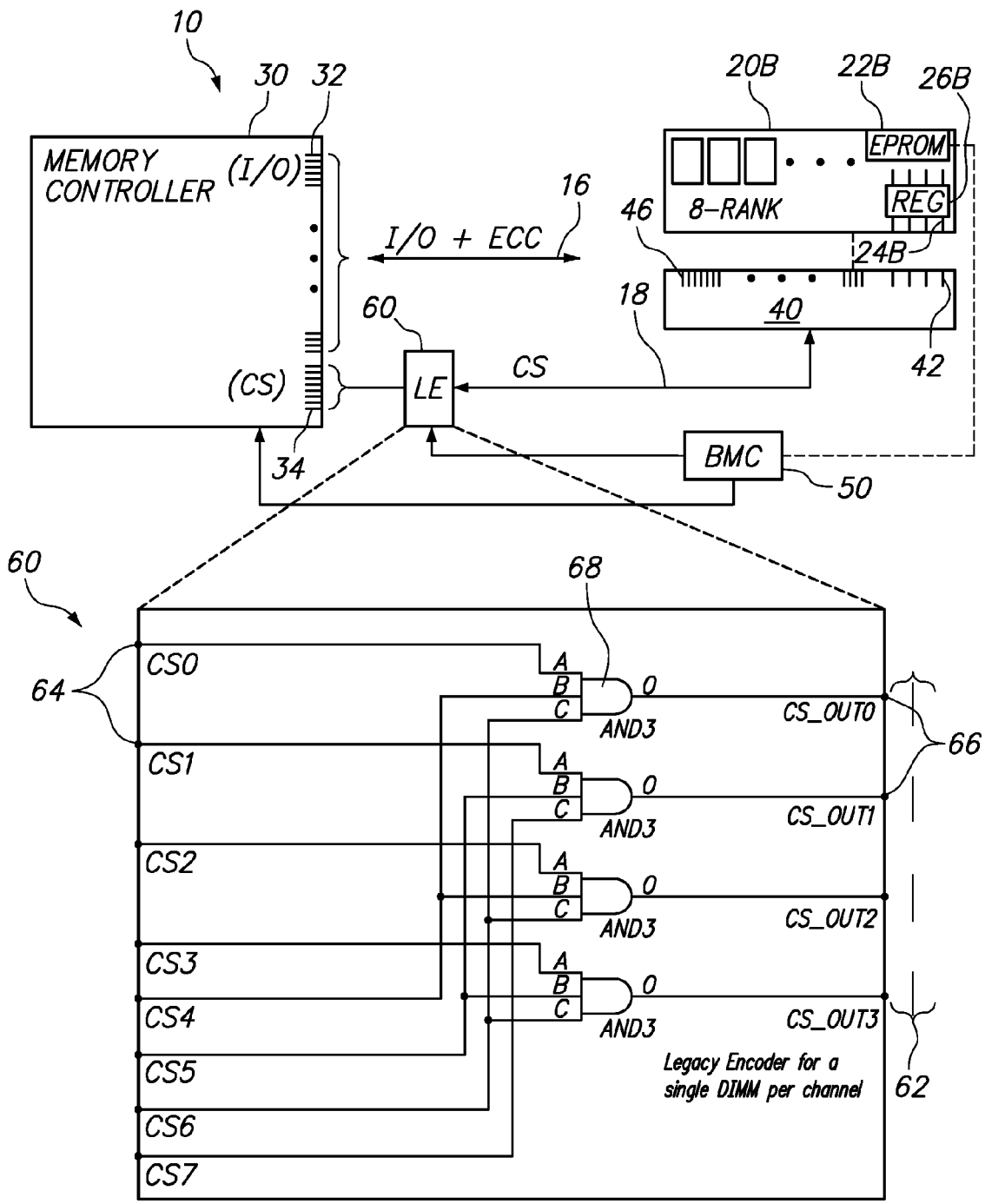
FIG. 3 is a schematic diagram of the one DIMM per channel memory system with an eight-rank DIMM inserted into the DIMM socket.

FIG. 3 is a schematic diagram of the one DIMM per channel memory system 10 with an eight-rank DIMM 20B inserted into the DIMM socket 40. The BMC 50 or system memory controller 30 reads the EPROM 22B to identify that the DIMM 20B has eight ranks and reports the presence of the eight ranks to the legacy encoder 60 and the memory controller 30. Unless the legacy encoder functions are built into the memory controller, it may not be necessary for the memory controller 30 to distinguish between whether it is controlling a single eight-rank DIMM instead of two four-rank DIMMs of a conventional memory system. However, the legacy encoder 60 will read/write or configure all eight ranks in response to the presence of the eight-rank DIMM in the memory system 10. With the eight-rank DIMM 20B inserted, the legacy encoder 60 receives the eight-bit output from the eight CS pins 34 and selectively generates a different four-bit word 62 uniquely specifying each of the eight ranks. Some of the eight ranks may be specified with a four-bit word having a single active bit, while other ranks will be specified using more than one active bit. (An exemplary encoding for each of the ranks is provided in FIG. 4, as will be discussed below.) The four-bit word 62 can be transmitted along four CS lines of the control bus 18 to the four CS pins 42 on the conventional DIMM socket 40. The four bit word is received by four CS pins 24B on the DIMM 20B and is passed to a register 26B on the DIMM. The register 26B interprets the four-bit word to identify the selected rank. The register 26B may convert the four-bit word 62 (corresponding to the 4-bit CS_OUT of FIG. 4) into eight individual CS signals (corresponding to the 8-bit CS_IN of FIG. 4). Accordingly, read/write and error correction signals can be transmitted to the selected rank from the I/O+ECC pins 32 on the memory controller 30, along the seventy-two bit I/O data bus 16, to seventy-two corresponding I/O+ECC pins 46 on the DIMM socket 40.

FIG. 4 is a table illustrating an exemplary encoding for the eight-bit input to the legacy encoder (the eight CS inputs) and corresponding four-bit output of the legacy encoder in the single DIMM per channel memory system with a single eight-rank DIMM inserted of FIG. 3. All eight ranks may be uniquely specified using only a four digit word. Some of the ranks are uniquely specified with a four-digit word having only a single active digit, whereas other ranks are uniquely specified using a four-digit word having more than one active bit. In particular, the first four ranks may each be specified by a four-bit word having a single-active bit. In this embodiment, the eight-bit input and corresponding four bit output for the first four ranks is identical to the eight-bit input and corresponding four bit output shown in FIG. 2 for the four-rank DIMM. For example, the memory controller may select Rank-2 by generating the single-active, eight-bit word "1 0 1 1 1 1 1 1," in response to which the legacy encoder outputs the single-active, four-bit word "1 0 1 1.". However, to communicate the selection of the additional four ranks (Ranks 5-8), the legacy encoder outputs a four-bit word having two active bits. For example, to select Rank-6, the memory controller still generates the single-active, eight-bit output "1 1 1 1 1 0 1 1," in response to which the legacy encoder outputs the dual-active, four-bit word "1 0 1 0.". The register 26B of the DIMM 20B of FIG. 3 contains programming or circuitry that allows it to convert each four-bit word into eight CS signals in accordance with the table in FIG. 4. For example, if the register 26B receives the four-bit word "1 0 1 0", then the register 26B electronically determines that the selected rank is "Rank-6."

Comparing the tables of FIGS. 2 and 4, it may be observed that the CS output for the first four ranks is the same whether a four-rank DIMM is inserted as per FIG. 1 or an eight-rank DIMM is inserted as per FIG. 3. Also, the CS output for the first four ranks is optionally specified by a single active bit. Although these two features are not required of every embodiment, these features simplify the operation of the memory system 10 embodied in FIGS. 1 and 3 by avoiding the need to alter the CS output for Ranks 1-4 according to the number of ranks of the inserted DIMM. The same output patterns may be used for one-, two-, and four-rank operation.

Figure 5:
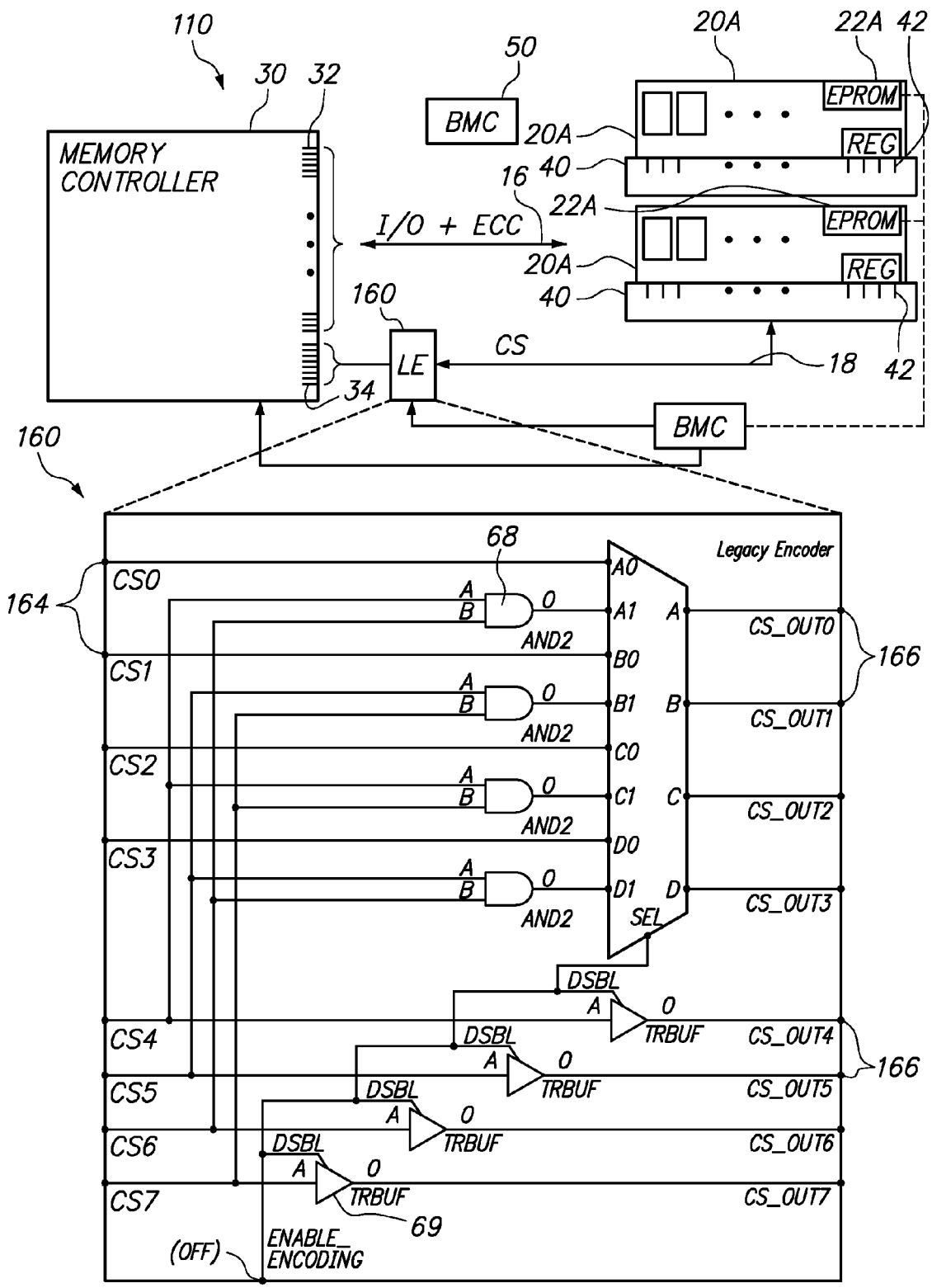
FIG. 5 is a schematic diagram of a memory system according to another embodiment of the invention, with support for up to two DIMMs per channel.

FIG. 5 is a schematic diagram of a memory system 110 according to another embodiment of the invention, with support for up to two DIMMs per channel. The memory system 110 shares many of the same components as the memory system 10 of FIG. 1, which will be accorded like reference numerals. The memory system 110 includes two DIMM sockets 40 each having four CS pins 42, and is configured for interchangeably operating either dual four-rank DIMMs per channel (as shown here in FIG. 5) or a single eight-rank DIMM (as will be shown in FIG. 7). In FIG. 5, two of the conventional four-rank DIMMs 20A are installed in the DIMM sockets 40. The BMC 50 reads the EPROMs 22A on the two four-rank DIMMs 20A and reports their specifications to a legacy encoder 160. In response to identifying that both DIMM sockets 40 are populated, the legacy encoder 160 passes the output from all eight CS pins 34 to the eight available control lines in the CS control bus 18. Four of the CS pins 34 on the memory controller 30 are associated with the four CS pins 42 on one of the two DIMM sockets 40 and the other four CS pins 34 are associated with the four CS pins 42 on the other DIMM socket 50. Thus, each of the eight CS pins 34 may be uniquely associated with the eight ranks collectively provided on the two four-rank DIMMs 20A, and the memory controller 30 may select a particular rank by activating only one CS pin 34 at a time, e.g. by outputting a 0 at the CS pin associated with the selected rank and outputting 1s for the remaining seven CS pins 34.

An expanded view of the circuitry of the legacy encoder 160 is schematically shown in FIG. 5. The legacy encoder 160 includes eight CS inputs 164 labeled from "CS0" to "CS7" and eight CS outputs 166 labeled from "CS_Out0" to "CS_Out7." The eight CS inputs 164 are coupled to the eight CS pins 34 on the memory controller 30. Four of the CS outputs CS_OUT0 to CS_OUT3 are coupled to four CS inputs 42 on one of the DIMMs 20A over four CS lines on the CS control bus 18. The other four CS outputs CS_OUT4 to CS_OUT7 are coupled to the four CS inputs 42 on the other DIMM 20A over the other four CS lines on the CS control bus 18. The CS inputs 164 are tied to the CS outputs 166 through an exemplary circuit including a multiplexer ("MUX") 67, "AND" gates 68, and diodes 69. When two four-rank DIMMs are inserted, an "Enable Encoding" pin selects the inputs of the MUX 67, which allows the legacy encoder 160 to essentially pass the eight chip select bits from the memory controller 30 from the CS inputs CS0-CS7 to the CS outputs CS_Out0-CS_Out7, in one-to-one correspondence.

FIG. 6 is a table illustrating the eight-bit input to the legacy encoder 160 from the memory controller 30 in the memory system 110 of FIG. 5, and the corresponding eight-bit output. A "Rank" column lists the eight ranks that the memory controller is capable of independently selecting. Eight "CS_IN" columns list the state of the eight CS pins on the memory controller as input to the legacy encoder. Each rank may be uniquely identified by the memory controller with an eight-bit word consisting of one active bit (0) corresponding to the currently selected rank and seven inactive bits (1s). Because there are four CS pins 34 provided on each of the two DIMM sockets 40, each rank may be identified by a single active bit. For example, the 4th rank of the first DIMM 20A may be selected with a single active CS bit 4, and the first rank of the second DIMM 20A may be selected with a single active CS bit 5.

Figure 7:
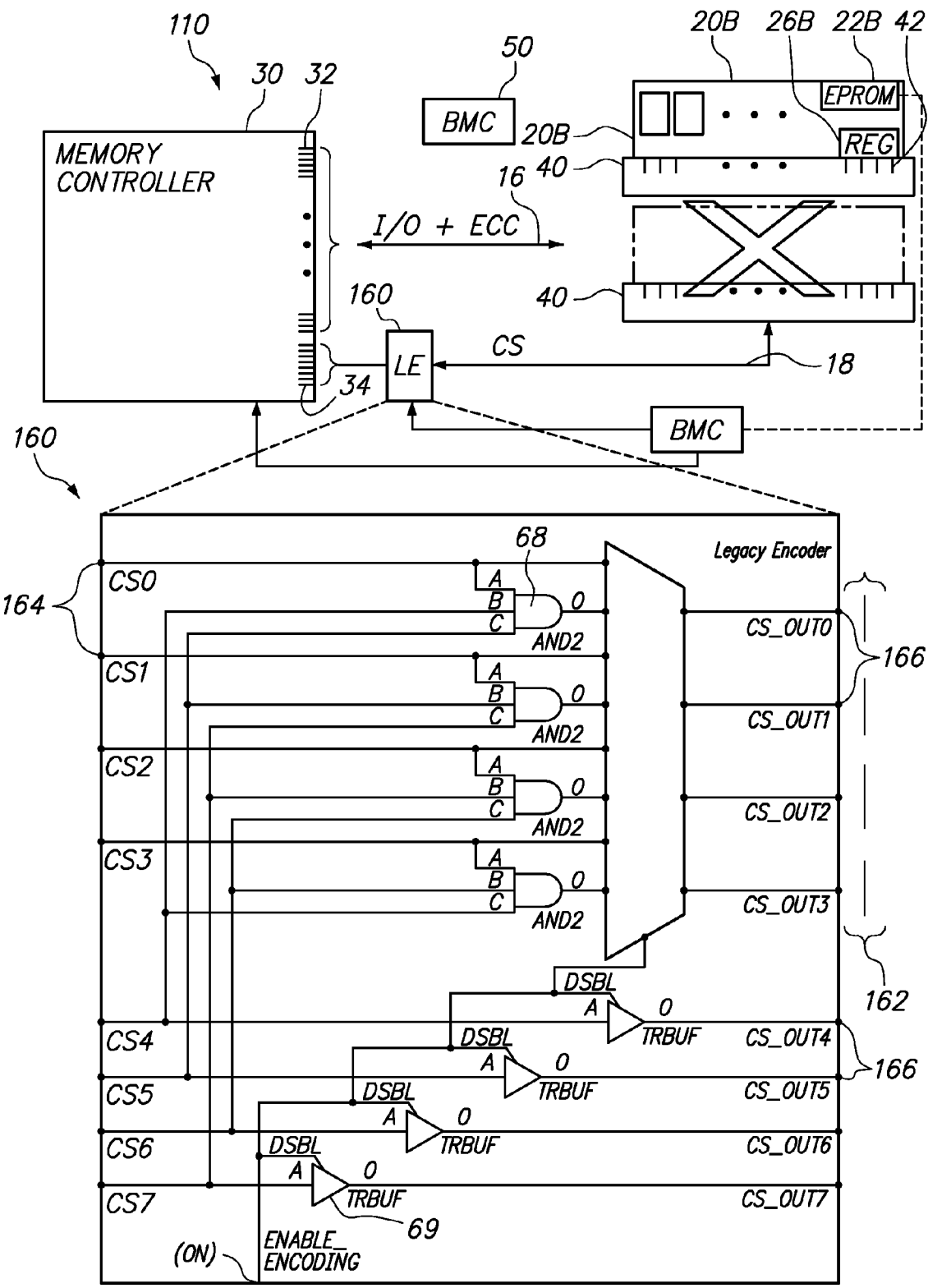
FIG. 7 is a schematic diagram of the two DIMM per channel memory system with a single eight-rank DIMM installed in one of the DIMM sockets and with the other DIMM socket empty.

FIG. 7 is a schematic diagram of the memory system 110 with a single eight-rank DIMM 20B installed in one of the DIMM sockets 40, and with the other DIMM socket 40 empty. The BMC 50 reads the EPROM 22B on the eight-rank DIMM 20B and reports its specifications to the legacy encoder 160. The "Enable Encoding" pin turns off any drivers from driving signals to the unpopulated second socket to help save power and prevent any electromagnetic radiation from being emitted due to the unloaded interconnect acting as an antenna. For example, the Enable Encoding pin may drive CS_OUT4-7 high, or alternatively tri-state the outputs and leave them floating as indicated schematically. The memory controller 30 still selects a particular rank in a conventional manner, by activating a single CS pin 34 at a time. However, because only four CS pins 42 are available on the DIMM socket 40 to select from among eight ranks on the inserted DIMM 20B, the ability of the legacy encoder 160 to represent each rank with an encoded four-bit word having more than one active bit allows the identity of the selected rank to be communicated to the DIMM 20B over only four CS pins 42. The register 26B interprets or "decodes" the four-bit word to identify the selected rank. Read/write signals can be transmitted to the selected rank from the I/O pins 32 on the memory controller 30, along the seventy-two bit I/O+ECC data bus 16, to sixty-four I/O pins 46 on the DIMM socket 40.

In the embodiment of FIG. 7, it is necessary for the eight-rank DIMM to be installed in the socket that receives CS_OUT0 through CS_OUT3. However, it should be recognized that further embodiments of the legacy encoder could detect which socket receives the eight-rank DIMM and direct the four-bit word to the relevant socket. In a further alternative, upon being informed that an eight-rank DIMM has been installed, the legacy encoder could send the same four-bit word to each socket so that the eight-rank DIMM will receive the four-bit word regardless of where the eight-rank DIMM has been installed. However, in this latter embodiment, measures could be taken to ensure that no additional DIMMs are operatively received in the second socket while an either-rank DIMM is installed.

FIG. 8 is a table correlating the eight CS inputs to the legacy encoder 160 of FIG. 7 and the corresponding four-bit encoded CS output. Each of the eight ranks on the eight-rank DIMM may be uniquely specified and individually selected by a four-bit word using one or more active bits. For example, the memory controller may select Rank-3 by generating the eight-bit word "1 1 0 1 1 1 1 1," in response to which the legacy encoder outputs the four-bit word "1 1 0 1" having only a single active bit. To select Rank-7, the memory controller generates "1 1 1 1 1 1 0 1," in response to which the legacy encoder outputs the encoded four-bit word "0 1 1 0" having two active bits to DIMM Socket 1.

Figure 9:
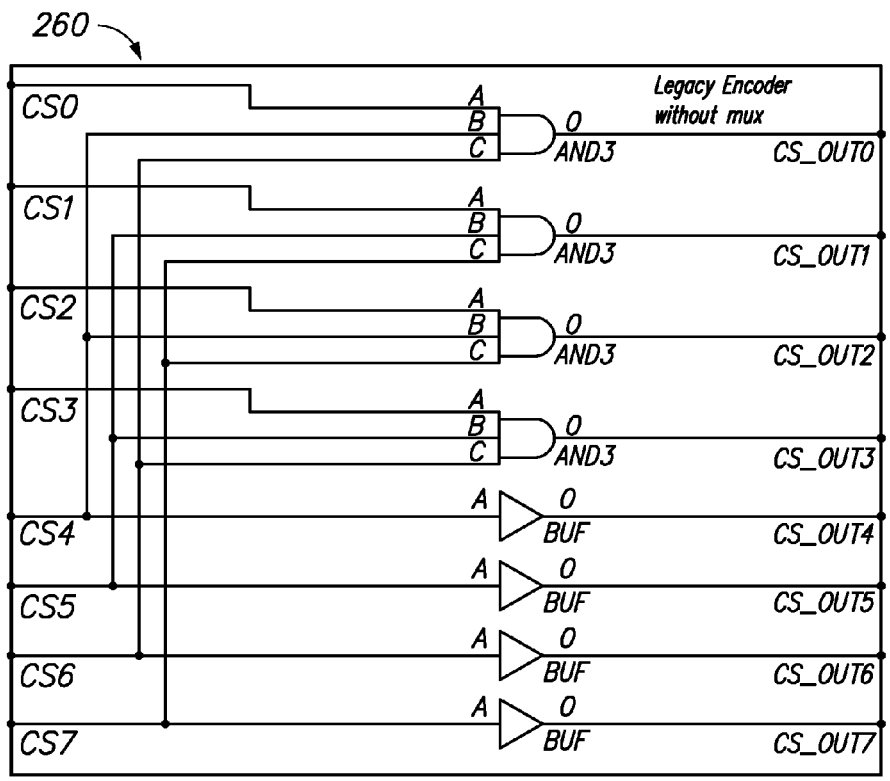
FIG. 9 is an alternative configuration of a legacy encoder for use in a two DIMM per channel memory system, such as in FIGS. 5 and 7.

FIG. 9 is an alternative configuration of a legacy encoder 260 for use in a two DIMM per channel memory system, such as in FIGS. 5 and 7. The legacy encoder 260 generates the same output according to the table in FIG. 8, without the use of a MUX. In this simple scenario, CS_OUT4-7 drive the chip select signals generated at CS inputs CS4-CS7 regardless of whether the second slot is populated by a DIMM.

The exemplary embodiments presented herein are discussed primarily in the context of memory controllers having eight CS pins, DIMM sockets with four CS pins, four-rank or eight-rank DIMMs, and either one or two DIMMs per channel. For example, in the case of an eight-rank DIMM inserted into a DIMM socket having only four CS pins, the above embodiments illustrate how it is useful to generate an encoded four-bit word uniquely identifying the selected rank, so that the selected rank may be identified over the four CS pins (after which the encoded four-bit word is decoded by a register, and so forth). However, the invention may equally be applied to memory system components having a different number of CS pins, ranks, and/or number of DIMMs per channel. In general, generating an encoded multi-bit chip select signal in accordance with the described embodiments of the invention is desirable when the number of chip select bits is fewer than the number of ranks from which to select a rank. For example, in a hypothetical six-rank DIMM, an encoded three-bit chip selection signal could be generated and communicated over three CS pins.

The number of different ranks that may be uniquely associated with an encoded chip-select signal is limited by the number of unique combinations of bits that could be generated. For example, a four-bit word wherein each bit can be a zero or a one is capable of generating 2 ^ 4=16 unique combinations of bits. However, it should be noted that some combinations of bits may be reserved to trigger functions other than selecting a rank. For example, a particular four-bit word may be assigned a function such as "CKE and ODT control" or "self time refresh." Also, the four-bit word "1 1 1 1" generally indicates that no rank is selected.

Figure 10:
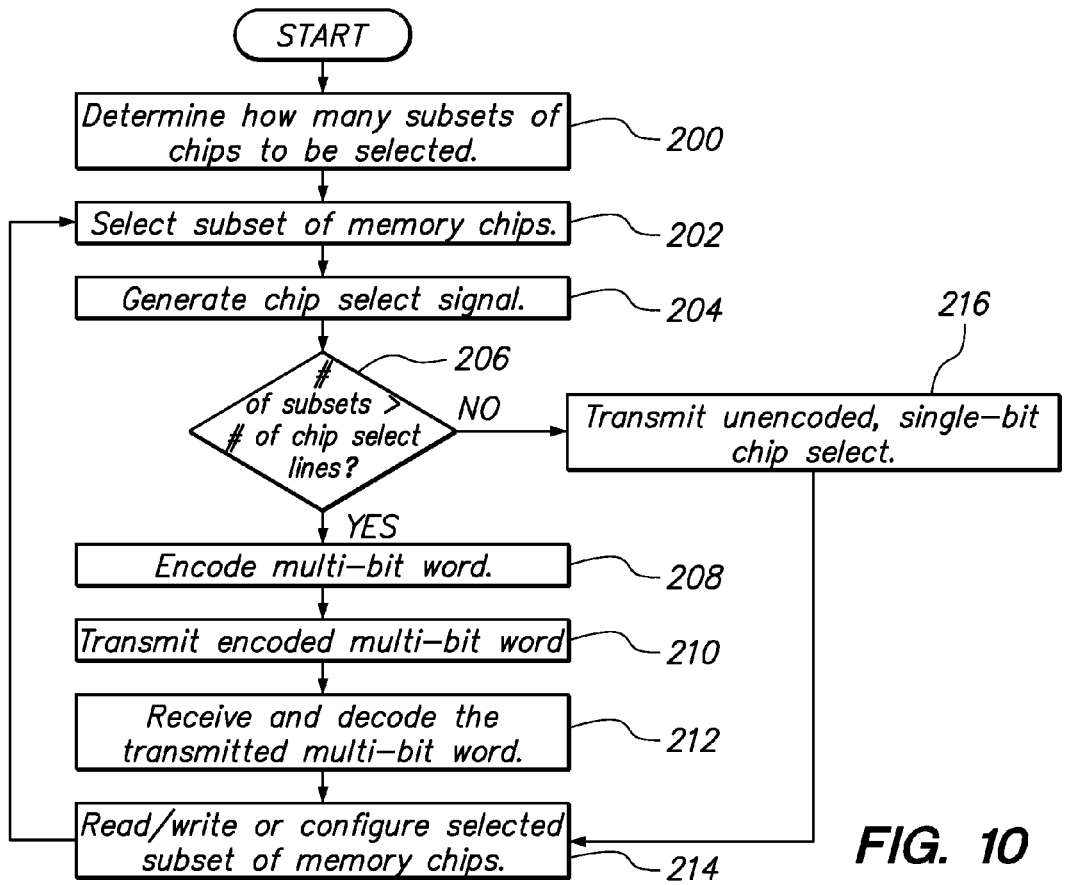
FIG. 10 is a flowchart generally outlining a method according to an embodiment of the invention.

FIG. 10 is a flowchart generally outlining a method according to an embodiment of the invention. Step 200 involves determining how many subsets of chips are to be selected. In the case of one or more DIMMs, this step may involve determining how many ranks are on the DIMM(s), with a rank being the most common example of a predefined subset of memory chips. Step 202 involves selecting one of a plurality of predefined subsets of memory chips (e.g. a particular rank) on a memory module (e.g. a DIMM) to read/write to. In step 204, a single-bit chip-select signal is generated, typically by a memory controller, uniquely identifying the selected subset of memory chips. Conditional step 206 involves determining if the number of subsets (e.g. ranks) exceeds the number of chip select lines. For example, if a DIMM socket has four CS pins, and a memory controller is in communication with the four CS pins over four CS lines of a memory bus, then an eight-rank DIMM would have a number of subsets (eight ranks) that exceeds the number of chip select lines (four CS lines). If the number of subsets does exceed the number of CS lines, then step 208 entails encoding the chip select signal as a multi-bit word having a bit width that is less than the number of predefined subsets of memory chips. Continuing with the above example, the chip select signal uniquely identifying one of the eight ranks on the DIMM could be encoded as a four-bit word. Step 210 involves transmitting each bit of the encoded chip select signal along a separate chip select line, such as on the memory bus, to the DIMM. In step 212, the transmitted chip select signal is decoded on the DIMM to identify which of the either rank is being selected. Step 214 involves reading/writing or configuring the selected subset of memory chips identified by the decoded chip select signal. Alternatively, if the number of subsets does not exceed the number of CS lines in conditional step 206, then the un-encoded, single-bit chip select signal could be transmitted directly in step 216 to identify the selected subset of memory chips to read/write or configure in step 214. While the flowchart outlines the steps of one embodiment, reference may be made to the other figures and accompanying text for further details and options regarding the steps of the outlined method.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   selecting one of a plurality of ranks, each rank uniquely associated with a different subset of memory chips on a memory module;
   generating a chip select signal uniquely identifying the selected rank;
   encoding the chip select signal as a multi-bit word having fewer bits than the number of ranks;
   transmitting each bit of the multi-bit word along a separate chip select line to the memory module; and
   receiving and decoding the transmitted multi-bit word by a register on the memory module to determine the selected rank and reading or writing to the subset of memory chips associated with the selected rank.

2. The method of claim 1, wherein the step of generating a chip select signal uniquely identifying the selected rank comprises activating one of a plurality of chip select lines, wherein the activated one chip select line is uniquely associated with the selected rank.

3. The method of claim 1, wherein the step of decoding the transmitted multi-bit word comprises referencing a register of the memory module that uniquely associates each rank with a different value of the multi-bit word.

4. The method of claim 1, wherein the plurality of ranks is eight ranks.

5. The method of claim 4, wherein the multi-bit word is a four-bit word.

6. The method of claim 1, further comprising generating the multi-bit word using a single active bit to specify at least one rank and generating the multi-bit word using more than one active bit to specify at least one other rank.

7. The method of claim 6, further comprising automatically detecting whether the memory module has a number of ranks equal to or greater than the number of bits in the multi-bit word to be encoded, and using more than one active bit to encode the multi-bit word only when the number of ranks exceeds the number of bits in the multi-bit word to be encoded.

8. The method of claim 1, wherein the step of generating a chip select signal uniquely identifying the selected rank comprises generating a single active bit on a chip select line associated with the selected rank and generating an inactive bit on chip select lines associated with each of the other ranks.

9. The method of claim 8, wherein the step of generating an active bit comprises setting the lower of two voltage states on the chip select line associated with the selected rank and the step of generating an inactive bit comprises setting the higher of two voltage states on the chip select lines associated with the other ranks.

10. A memory system, comprising:
    a memory controller in communication with a plurality of chip select lines on a memory bus, wherein each chip select line is uniquely associated with a different memory rank, the memory controller configured for selecting one of the memory ranks;
    a signal encoder configured for selectively encoding a multi-bit word representing the selected rank using fewer bits than the number of ranks and communicating each bit of the encoded multi-bit word on a separate chip select line of the memory bus;
    a memory module socket in communication with the signal encoder and the memory controller over the memory bus; and
    a memory module removably inserted in the memory module socket, the memory module including at least some of the plurality of memory ranks and a register for receiving and interpreting the encoded multi-bit word from the signal encoder to determine the selected rank and for routing read/write signals between the memory controller and the selected rank over the memory bus if the selected rank is on the memory module.

11. The memory system of claim 10, wherein the memory controller is configured to generate an eight-bit chip-select output to the signal encoder, and wherein the multi-bit word generated by the signal encoder is a four-bit word.

12. The memory system of claim 11, wherein the memory module socket includes four chip-select pins for communicating the encoded four-bit chip-select signal to the memory module.

13. The memory system of claim 12, wherein the memory module socket is configured to interchangeably receive either a four-rank DIMM or an eight-rank DIMM.

14. The memory system of claim 10, wherein the signal encoder is configured to generate the multi-bit word using a single active bit to specify at least one rank and generate the multi-bit word using more than one active bit to specify at least one other rank.

15. The memory system of claim 14, further comprising:
- a memory location on the memory module containing an electronic record of the number of ranks on the memory module;
- a register on the memory module containing an electronically readable correlation between different values of the encoded four-bit word and the ranks associated with the different values of the encoded four-bit word; and
- a service processor in communication with the memory module and the signal encoder for signaling the signal encoder to be in active mode when the number of ranks on the memory module exceeds the number of chip select lines.

16. The memory system of claim 10, wherein the signal encoder is incorporated into the memory controller.

17. The memory system of claim 10, wherein the signal encoder comprises an integrated circuit separate from the memory controller.

18. The memory system of claim 10, further comprising a second memory module socket configured for receiving a second memory module on a shared memory channel.

* * * * *